(12) United States Patent
Fabris et al.

(10) Patent No.: US 11,068,820 B2
(45) Date of Patent: Jul. 20, 2021

(54) AVOIDING PEAK ENERGY DEMAND TIMES BY MANAGING CONSUMER ENERGY CONSUMPTION

(71) Applicant: International Business Machines Corporation, Armonk, NY (US)

(72) Inventors: Alessandro Fabris, Winchester (GB); Matthew Fawcett, Hull (GB)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 16/212,561

(22) Filed: Dec. 6, 2018

(65) Prior Publication Data
US 2020/0184395 A1    Jun. 11, 2020

(51) Int. Cl.
| G06Q 10/06 | (2012.01) |
| G06F 17/18 | (2006.01) |
| G06Q 10/04 | (2012.01) |
| G06Q 50/06 | (2012.01) |

(52) U.S. Cl.
CPC ....... *G06Q 10/06315* (2013.01); *G06F 17/18* (2013.01); *G06Q 10/04* (2013.01); *G06Q 50/06* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| 7,683,578 B2 * | 3/2010 | Wang ................. G06F 1/3228 320/132 |
| 8,019,697 B2 | 9/2011 | Ozog |
| 8,706,650 B2 | 4/2014 | Ozog |
| 9,171,256 B2 | 10/2015 | Mohagheghi et al. |

(Continued)

FOREIGN PATENT DOCUMENTS

WO    2016037013 A1    3/2016

OTHER PUBLICATIONS

E. Silva, Leandro Rodrigues Manso, Calos Augusto Duque, and Paulo F. Ribeiro. "Smart signal processing for an evolving electric grid." EURASIP Journal on Advances in Signal Processing 2015.1 (2015): 1-13. (Year: 2015).*

(Continued)

*Primary Examiner* — Alan S Miller
(74) *Attorney, Agent, or Firm* — Zilka-Kotab, P.C.

(57) ABSTRACT

A computer-implemented method, according to one embodiment, includes: receiving data which corresponds to energy consumption of two or more different consumer systems. The energy consumption data is used to generate a consumption profile for each of the consumer systems, where the consumption profile for a given consumer system identifies recurring energy consumption periods for the given consumer system and a corresponding flexibility metric for each of the recurring energy consumption periods. The consumption profiles are further used along with current energy demands to predict peak demand times. Moreover, prior to each of the predicted peak demand times, a suggestion is issued to each of one or more of the consumer systems, where each of the suggestions proposes making an amendment to the energy consumption of the respective consumer system in order to reduce energy demand during one or more of the predicted peak demand times.

18 Claims, 4 Drawing Sheets

(56) References Cited

U.S. PATENT DOCUMENTS

| | | | | |
|---|---|---|---|---|
| 9,563,924 | B2* | 2/2017 | Ghosh | G05B 13/048 |
| 10,371,861 | B2* | 8/2019 | Yu | G06Q 50/06 |
| 2004/0225649 | A1* | 11/2004 | Yeo | G01D 4/004 |
| 2006/0089844 | A1* | 4/2006 | Dickinson | B60L 58/12 |
| | | | | 705/28 |
| 2008/0255899 | A1* | 10/2008 | McConnell | G06Q 10/06 |
| | | | | 705/7.37 |
| 2009/0187445 | A1* | 7/2009 | Barclay | G06F 30/13 |
| | | | | 702/60 |
| 2009/0200867 | A1* | 8/2009 | Katz | H02J 13/00009 |
| | | | | 307/40 |
| 2010/0131329 | A1* | 5/2010 | An | G06Q 30/00 |
| | | | | 705/63 |
| 2010/0211443 | A1* | 8/2010 | Carrel | G06Q 30/0208 |
| | | | | 705/14.11 |
| 2011/0106328 | A1 | 5/2011 | Zhou et al. | |
| 2011/0106471 | A1 | 5/2011 | Curtis et al. | |
| 2012/0065791 | A1* | 3/2012 | Besore | G06Q 50/06 |
| | | | | 700/291 |
| 2012/0109392 | A1* | 5/2012 | Hanks | H02J 3/382 |
| | | | | 700/291 |
| 2012/0290230 | A1* | 11/2012 | Berges Gonzalez | |
| | | | | G05B 19/0428 |
| | | | | 702/61 |
| 2012/0296799 | A1* | 11/2012 | Playfair | H02J 3/008 |
| | | | | 705/37 |
| 2013/0144451 | A1* | 6/2013 | Kumar | G05B 13/02 |
| | | | | 700/291 |
| 2014/0148963 | A1* | 5/2014 | Ozog | G06Q 50/06 |
| | | | | 700/291 |
| 2015/0310465 | A1 | 10/2015 | Chan et al. | |
| 2015/0347943 | A1* | 12/2015 | Burke | G06Q 10/06312 |
| | | | | 705/7.22 |
| 2016/0004290 | A1 | 1/2016 | Bukhin et al. | |
| 2016/0055419 | A1 | 2/2016 | Fischer et al. | |
| 2017/0060109 | A1* | 3/2017 | Ghosh | G06Q 30/0206 |

OTHER PUBLICATIONS

Wikipedia, "Energy demand management," Wikipedia, Jun. 2018, 9 pages, retrieved from https://en.wikipedia.org/wiki/Energy_demand_management.

Wikipedia "Gamification," Wikipedia, Nov. 2018, 14 pages, retrieved from https://en.wikipedia.org/wiki/Gamification.

Wikipedia, "Multimodal distribution," Wikipedia, Aug. 2018, 15 pages, retrieved from https://en.wikipedia.org/wiki/Multimodal_distribution.

Wikipedia, "Independent component analysis," Wikipedia, Sep. 2018, 12 pages, retrieved from https://en.wikipedia.org/wiki/Independent_component_analysis.

Wikipedia, "Constrained optimization," Wikipedia, Sep. 2018, 4 pages, retrieved from https://en.wikipedia.org/wiki/Constrained_optimization.

Engie Storage, "Tips to Reduce Peak Demand Charges on Your Electric Bill," Engie Storage, Feb. 27, 2015, 6 pages, retrieved from https://www.engiestorage.com/tips-to-reduce-peak-demand-charges-on-your-electric-bill/.

FRESHPatents, "Opower Inc patents," FRESHPatents, New Patents & Technology, 2018, 15 pages, retrieved from https://stks.freshpatents.com/Opower-Inc-nm1.php on Dec. 6, 2018.

Stem, "Here to help," Stem, Energy Superintelligence, 2018, 3 pages, retrieved from https://www.stem.com/resources.

Anonymous, "Method and Framework to provide best option for Usage Plan for Device Class based on past energy usage, weather condition levering Machine Learning & Optimization," IP.com Prior Art Database, Technical Disclosure No. IPCOM000254234D, Jun. 13, 2018, 4 pages.

* cited by examiner

AVOIDING PEAK ENERGY DEMAND TIMES BY MANAGING CONSUMER ENERGY CONSUMPTION

BACKGROUND

The present invention relates to energy consumption, and more specifically, this invention relates to the management of consumer energy consumption.

Electric utilities include companies in the electric power industry which engage in electrical energy generation and/or distribution of electrical energy, where "energy" is the capacity to do work, while "power" is the rate of producing or consuming energy. Moreover, electrical energy is distributed across electrical energy distribution systems, or "grids", which include interconnected networks for delivering electricity from the utilities to consumers.

Advances in renewable energy and Internet of things (IoT) compatible devices have led to greater levels of granularity in terms of assessing the amount of power demanded by consumers from an energy grid. Although conventional analytics provide information which informs both consumers and utility companies how to forecast power consumption, the volatility of demand from individual consumers presents a significant problem to the conventional infrastructure of a utility company. For instance, inconsistencies in consumer demand lead to inefficiencies in the distribution and allocation of resources across industries, thereby resulting in unnecessarily high costs for all parties involved.

Although consumers are able to track their respective demand, metered services monitoring and distribution has conventionally occurred at the service provider level. Moreover, it is greatly undesirable for utility companies to make significant investments to upgrading their technologies in an attempt to overcome this issue without any assurance of achieving improvements. Accordingly, conventional electrical energy distribution systems have been unable to improve operating efficiency.

SUMMARY

A computer-implemented method, according to one embodiment, includes: receiving data which corresponds to energy consumption of two or more different consumer systems. The energy consumption data is used to generate a consumption profile for each of the consumer systems, where the consumption profile for a given consumer system identifies recurring energy consumption periods for the given consumer system and a corresponding flexibility metric for each of the recurring energy consumption periods. The consumption profiles are further used along with current energy demands to predict peak demand times. Moreover, prior to each of the predicted peak demand times, a suggestion is issued to each of one or more of the consumer systems, where each of the suggestions proposes making an amendment to the energy consumption of the respective consumer system in order to reduce energy demand during one or more of the predicted peak demand times.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1A:
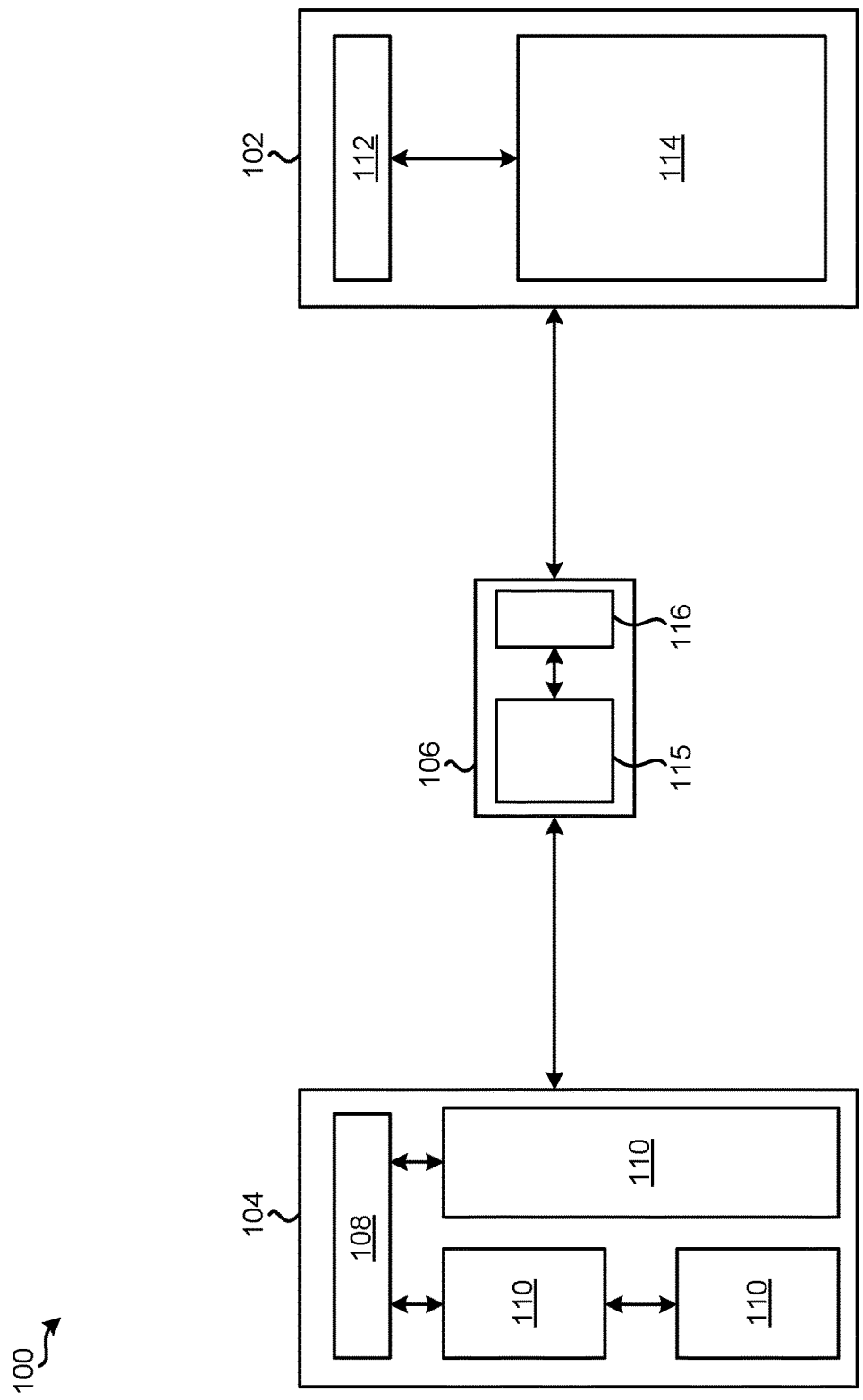
FIG. 1A is a representational view of an electrical supply system, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for reshaping the energy demand presented to a utility by a consumer system. In various approaches, this is achieved by implementing an electrical system which learns consumer habits and provides energy consumption suggestions which are tailored based on these habits, e.g., as will be described in further detail below.

In one general embodiment, a computer-implemented method includes: receiving data which corresponds to energy consumption of two or more different consumer systems. The energy consumption data is used to generate a consumption profile for each of the consumer systems, where the consumption profile for a given consumer system identifies recurring energy consumption periods for the given consumer system and a corresponding flexibility metric for each of the recurring energy consumption periods. The consumption profiles are further used along with current energy demands to predict peak demand times. Moreover, prior to each of the predicted peak demand times, a suggestion is issued to each of one or more of the consumer systems, where each of the suggestions proposes making an amendment to the energy consumption of the respective consumer system in order to reduce energy demand during one or more of the predicted peak demand times.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: perform the foregoing method.

As previously mentioned, advances in renewable energy and IoT compatible devices have led to greater levels of granularity in terms of assessing the amount of power demanded by consumers from an energy grid. However, the volatility of demand from individual consumers presents a significant problem to the conventional infrastructure of utility companies. In fact, it is generally more difficult for a typical electrical utility to handle a volatile energy demand than it is to handle an energy demand that varies from, and even exceeds, the actual volatile energy demand but which also mirrors a prescribed demand profile for a given period of time. While IoT devices provide some insight into energy consumption, utility companies do not have the ability to estimate energy consumption for various consumers. Moreover, it is greatly undesirable for utility companies to make a significant investment to upgrade their technologies in an attempt to overcome this issue without any assurance of success. It follows that the ability to reshape the energy demands imposed by consumers on an energy grid such that they are more manageable is desired.

In sharp contrast to the foregoing shortcomings of conventional energy grids, various embodiments included herein introduce processes which are able to convince consumers to modify (e.g., reshape) their energy demands over time. Specifically, some of the embodiments included herein are able to reduce the overall cost of satisfying power demands by adjusting power demands to be more homogeneous over time. While minimizing the total consumer demand for energy has been implemented by controlling the demand schedules of multiple consumers, the ability to influence energy demands such that they are more homogeneous throughout the day on the microgrid level has not yet been achieved. Moreover, a general profile for a given consumer may be formed based on whether a consumer implements the power consumption suggestions provided to them, which indicates the user's flexibility and openness to suggestions.

With respect to the present description, "microgrid" is intended to refer to the consumers and secondary distribution systems connecting these consumers which are coupled downstream from a same medium-voltage-to-low-voltage transformer, e.g., as would be appreciated by one skilled in the art after reading the present description. Moreover, the term "consumer" as used herein is intended to denote any energy grid load which consumes electrical energy from and/or supplies electrical energy to a respective utility. Thus, a consumer may include any entity, e.g., such as a single residential household, a commercial office building, an individual electrically powered component (e.g., a super chiller), more than one residential household, etc., which is coupled to a utility by a grid which includes interconnected wired and/or wireless systems for delivering electricity from the utility to the consumer. In other words, any desired number of components powered by electrical energy may be considered as a "consumer", e.g., depending on the desired embodiment. In some approaches, a consumer also has access to local alternative sources of electrical energy (e.g., wind, solar, geothermal, etc.).

Thus, by influencing energy demands imposed by consumers on an energy grid, a utility is thereby able to satisfy even larger consumer demands and even prevent power outages from occurring. In various approaches, this is achieved by implementing an electrical system which learns consumer habits and provide energy consumption suggestions which are tailored based on these habits, e.g., as will be described in further detail below.

It follows that various ones of the approaches included herein have a consumer-centric focus. More specifically, some of the approaches herein include transforming consumer-generated internal demands to prevent spikes in the energy demands imposed on utilities. Again, by tailoring these suggestions based on the energy consumption habits of the various consumers to which the suggestions are provided, a higher success rate is achieved without imposing fines for non-compliance. Energy demand peak shaving is thereby achievable at the microgrid level by issuing these suggestions through multiple households.

Looking to FIG. 1A, a representational view of an electrical supply system 100 which includes a utility and one or more electrically powered components at a given consumer location, is illustrated in accordance with one embodiment. As an option, the present system 100 may be implemented in conjunction with features from any other embodiment listed herein, such as those described with reference to the other FIGS. However, such system 100 and others presented herein may be used in various applications and/or in permutations which may or may not be specifically described in the illustrative embodiments listed herein. Further, the system 100 presented herein may be used in any desired environment. Thus FIG. 1A (and the other FIGS.) may be deemed to include any possible permutation.

As mentioned above, the system 100 includes a utility 102 and a consumer location 104 (which is also referred to herein as a "consumer system") which are connected to each other by a grid 106. The consumer location 104 further includes a controller (e.g., processor) 108 which is coupled to a plurality of electrically powered components 110. The electrically powered components 110 are coupled to each other and/or the controller 108 by physical electrical connections in some approaches, e.g., such as wiring, cables, etc. The utility 102 also includes a controller 112 which is coupled to an electrical energy source 114. Depending on the approach, the electrical energy source 114 may include any desired type of components and/or resources which are capable of producing electrical energy. The controller 112 thereby controls energy production in some approaches, e.g., based on energy demands received from the grid 106. Furthermore, the grid 106 includes a central controller 115 and a meter 116 which is used in some approaches to keep track of how much electrical energy is provided to the consumer location 104 by the utility 102.

Although not shown in FIG. 1A, in some approaches system 100 includes various switches which are either in an open configuration or a closed configuration in order to selectively direct current through the various electrical channels which have been represented in FIG. 1A. One or more inverters may also be positioned in system 100 such that electrical current may be converted from direct current (DC) to alternating current (AC) and vice versa, e.g., depending on the situation. Similarly, one or more rectifiers may be coupled to any batteries which may also be used to convert electrical current from DC to AC and vice versa as would be appreciated by one skilled in the art after reading the present description.

Figure 1B:
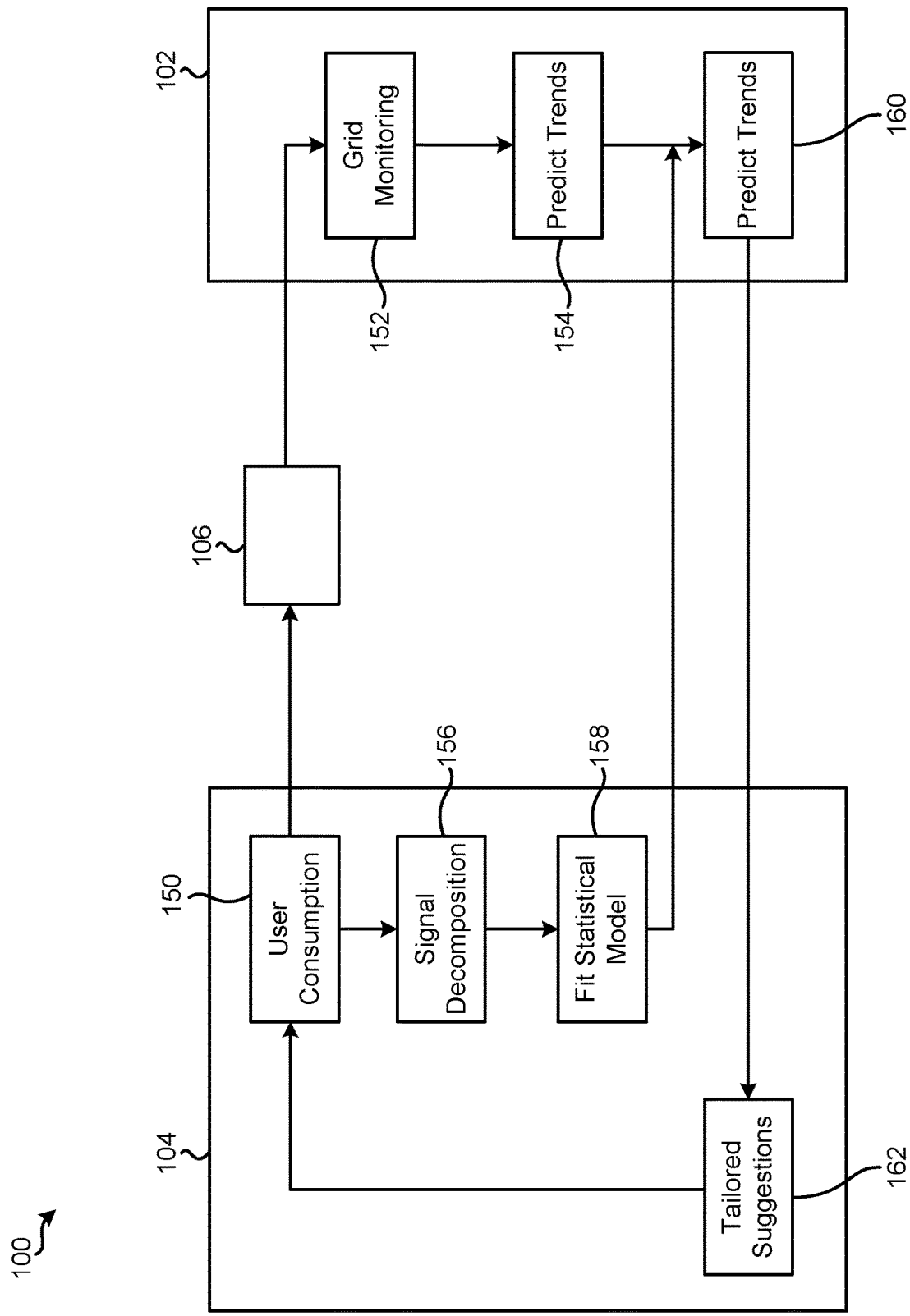
FIG. 1B is a high-level flowchart of a method implemented by the electrical supply system of FIG. 1A, in accordance with one embodiment.

Looking now to FIG. 1B, a high-level view of the path that information and/or electrical energy takes throughout the system 100 of FIG. 1A is illustrated in accordance with one embodiment. As an option, the present embodiment may be implemented in conjunction with features from any other embodiment listed herein, such as those described with reference to the other FIGS. However, the present embodiment and others presented herein may be used in various applications and/or in permutations which may or may not be specifically described in the illustrative embodiments listed herein. Further, the present embodiment may be used in any desired environment. Thus FIG. 1B (and the other FIGS.) may be deemed to include any possible permutation.

As shown, the consumer location 104 gathers energy consumption data over time and uses the data to maintain an accurate representation of the energy demands at the consumer location 104. See operation 150. A portion of the gathered energy consumption data includes current energy demands of the consumer location 104 in some approaches. Accordingly, the gathered energy consumption data is used to determine the current energy demands of the various electrical components included at the consumer location 104, which is then sent to the grid 106. Upon receiving the current energy demands from the consumer location 104, the grid 106 may analyze demand trends, determine a utility best suited to satisfy the energy demand in situations involving more than one available utility, etc. before actually transferring the demand to one of the utilities. Upon receiving the energy demand, the utility 102 performs grid monitoring (see operation 152) and predicts trends in the overall energy demands experienced thereby (see operation 154), e.g., as will be described in further detail below.

Returning to operation 150 of the consumer location 104, a signal decomposition of the energy consumption data is performed. See operation 156. Signal decomposition is preferably able to determine how much of the overall energy consumption data corresponds to each electrical component at the consumer location 104. For example, a signal decomposition operation is able to separate the amount of electrical energy consumed by the household refrigerator from the amount of electrical energy consumed by the household television, and further from the amount of electrical energy consumed by the household heating, ventilation, and air conditioning (HVAC) system, etc. According to some approaches, a variable of ICA may be implemented to perform the signal decomposition, but any type of signal decomposition which would be apparent to one skilled in the art after reading the present description may be implemented. This decomposed information is further used in an attempt to fit a statistical model which may thereby be used to represent the energy consumption habits of a household, at least to some extent. See operation 158.

The output of operation 158 is equivalent to a multimodal distribution of the energy demands for the various electrical components included at the consumer location 104 in some approaches. However, any other type of model which is able to describe energy demand habits in terms of preferred consumption times and a corresponding flexibility metric, e.g., depending on the desired approach. It follows that from the model determined in operation 158, the system 100 is able to obtain "statements" which describe the energy consumption traits of the given consumer location based on statistics derived therefrom.

According to an example which is in no way intended to limit the invention, the system 100 is able to determine that the consumer location tends to use the washing machine around time x1 and x2 with a variance of y1 and y2, respectively. The variance is used in some approaches in order to determine (e.g., measure) the flexibility corresponding to the action which causes the energy demand. For instance, if the variance "y" associated with a given action is determined to be zero, the action is always performed at a specific time "x" without deviation.

It follows that the model which describes the energy demand habits of a given consumer location 104 decomposes the sum of the signals included in the total energy load of the given location into single components. As mentioned above, this allows the system 100 to accurately determine the precise amount of energy consumed by each of the electrical components included at the consumer location 104. This information may further be used to construct targeted suggestions, each of which propose making an amendment to the energy consumption of the respective consumer system in order to reduce energy demand during one or more of the predicted peak demand times, e.g., as will be described in further detail below. However, it should also be noted that signal decomposition and/or the related operations described herein may be performed by one or more components at the grid 106 and/or the utility 102 itself. Accordingly, the flowchart illustrated in FIG. 1B is in no way intended to be limiting, but rather is presented by way of example.

The utility 102 maintains an updated understanding of the overall load requested by the microgrid coupled thereto. Accordingly, operation 152 includes performing grid monitoring. Again, the overall energy demand presented by the microgrid as a whole is made up of the energy demands of a number of different consumers. The utility 102 is thereby able to analyze the microgrid load and predict spikes as well as dips in consumer demands based on consumption profiles of the consumers themselves. See operation 154.

In some approaches historical data is also used to predict changes in energy demand. These predictions are further used in preferred approaches to determine and suggest changes various ones of the consumer demands that, if implemented by the users to which the changes are suggested, would result in a more evenly distributed energy demand imposed on the utility 102. Thus, operation 160 involves optimizing the predicted energy demand trends, e.g., by reducing energy consumption during predicted peak energy consumption periods. A result of this optimization process is also issued to the consumer location 104 in the form of targeted energy consumption suggestions, which the consumer location 104 has the ability to implement or reject as seen in operation 162. Results of whether any of the targeted suggestions are actually implemented at the consumer location 104 are gathered over time and used to update the representation of the energy demands at the consumer location 104 at operation 150.

This process of suggesting changes to various consumers is based on consumption information gathered from the different consumer locations themselves. Accordingly, cognitive systems which are capable of collecting and transmitting this consumption information are preferably implemented at the consumer locations, e.g., as would be appreciated by one skilled in the art. For example, an IoT system which is able to collect energy consumption data from various electrical components at the consumer location 104 and transmit the collected data to the utility 102 and/or the grid 106 may be implemented.

This process of determining changes to the energy consumption of individual consumers which will produce a more homogeneous energy demand profile of the microgrid as a whole involves performing an optimization procedure which includes both soft and hard constraints. For instance, energy demands which are difficult to shift to a different time during the day may be considered hard constraints, while energy demands which have more flexibility in the manner which they are implemented are considered soft constraints. In some exemplary approaches, which are in no way intended to limit the invention, this optimization procedure involves employing constrained optimization. Here, the dispatch times for the consumption of electrical energy "x" are represented as a function "f(x)" which incorporates the time-varying cost of said electrical energy, any hard constraints, while also satisfying consumer energy demands. Consumer habits are also incorporated in this optimization procedure in the form of soft constraints which involve preferred times and are further weighted in some approaches according to the flexibility by which they may be satisfied. In other words, the less flexible a consumer is with respect to a particular energy demand, the more difficult (e.g., more expensive) it is to reschedule when the energy demand is satisfied. It follows that various ones of the approaches included herein involve weighing the flexibility of various energy demands to determine an order in which the energy demands can be satisfied efficiently with respect to consumer desires while also reducing overall grid stress by maintaining an energy demand profile which lacks volatility.

According to an in-use example, which is in no way intended to limit the invention, but rather is presented to provide an exemplary option of how to perform the foregoing processes, User 1 and User 2 both need to use their respective washing machine for 1 hour. User 1 normally uses their washing machine around 5:00 PM, while User 2 normally uses their washing machine around 4:00 PM. Additionally, User 2 has been determined as being more flexible in terms of when they use their washing machine than User 1. Accordingly, the cost of disrupting user 1's habits "$100(x1-17)^2$" is higher than the cost of disrupting user 2's habits "$20(x2-16)^2$", as user 2 is again more flexible. It follows that this example essentially involves minimizing the cost of providing the requested energy at each of the dispatch times "x1" and "x2", and the intangible repercussions of disrupting consumer habits, e.g., as represented below in Equation 1.

$$\min[\text{cost}(x1)+\text{cost}(x2)+100(x1-17)^2+20(x2-16)^2] \quad \text{Equation 1}$$

The output of the statistical analysis performed in operation 158 of FIG. 1B is provided to the utility 102 such that power demands are more homogeneous over time, thereby reducing the overall cost of satisfying power demands. This consistent energy demand is formed by using the statistical information received from the consumer location 104 to determine a general profile for the consumer. As mentioned above, this profile may be formed based on whether a consumer implements the power consumption suggestions provided to them, which indicates the user's flexibility and openness to suggestions (e.g., see method 200 below).

Referring still to FIG. 1B, the utility 102 issues suggestions to the consumer location 104, the suggestions tailored based on the specific energy consumption traits of the given consumer and the corresponding flexibility thereof. As such, implementing these tailored suggestions results in a least amount of disruption at the consumer location 104 as possible, thereby providing a high likelihood of implementation and actual shifts of user consumption behavior. For example, a suggestion may take the form of a reward statement such as "by running your washing machine 1 hour earlier than you typically do, you may be able to save X dollars each month." According to another example, the suggestions issued to a consumer location may be compatible with a smart home system implemented at the given consumer location which is able to apply the suggestions as deemed appropriate for the user's benefit.

As a result, user consumption is expected to gradually shift away from identified peak energy consumption times. At a single consumer system, more flexible customers are able to experience rewards in the form of decreased demand charges, while at the microgrid level, the operator of the energy distribution system (e.g., utility provider) is able to postpone making upgrades to distribution lines that experience less stress as a result.

It follows that various embodiments included herein are able to manage and stabilize energy consumption at a number of consumer locations (or "systems") by implementing an interface that allows a bidirectional interaction between energy consumer and energy provider (e.g., the supply grid or the utility directly). A system interface is embodied at each of the consumer systems in some approaches, while in others the system interface is coupled to multiple consumer systems. Each of the consumer systems are thereby able to communicate with the utility and receive targeted suggestions which indicate when energy consumption is preferred and when it is not desirable.

These targeted suggestions are formed using information received from each of the consumer systems, e.g., including current energy consumption demands, historical data, etc. In other words, some of the embodiments herein are able to improve energy distribution by effectively learning user consumption habits for different components at each consumer system and characterize such consumption habits (e.g., in terms of mean of variance), thereby providing a metric of flexibility.

As a result, the overall system is able to provide targeted suggestion to specific consumer systems which are expected to be less disruptive based on the related flexibility metrics, and as such, are more likely to be implemented. This overall system may be automated or semi-automated depending on the approach. Thus, in some approaches the interface may be able to control home appliances directly by ingesting targeted suggestions received from the utility and applying them directly as deemed appropriate based on user preferences, flexibility metrics, current energy demands, etc., without user interaction. This could be particularly useful for embodiments involving electrical components such as storage heaters, water boilers, etc., whose energy consumption scheduling can be moved slightly without significantly impacting a user.

Figure 2A:
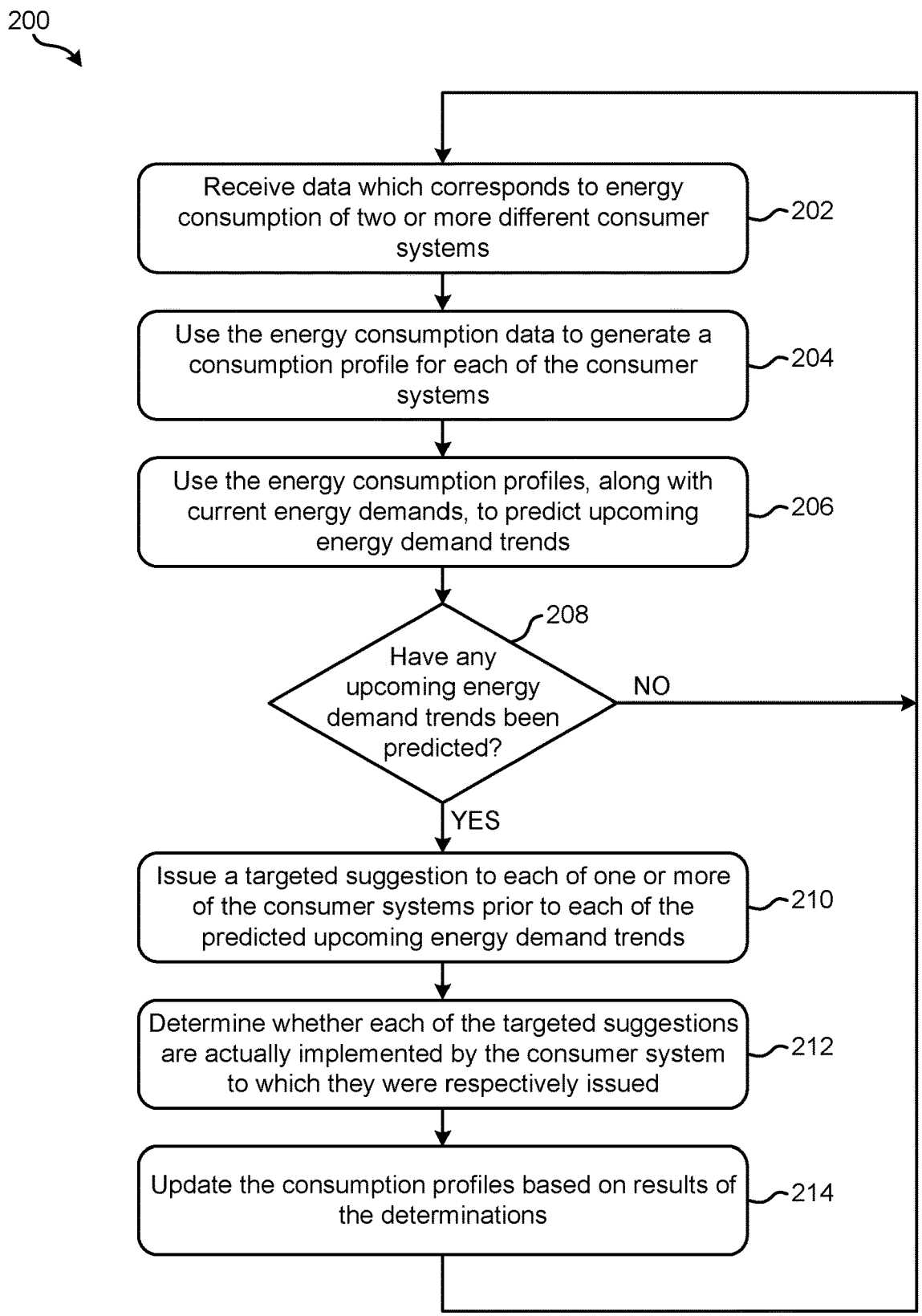
FIG. 2A is a flowchart of a method, in accordance with one embodiment.

Referring now to FIG. 2A, a flowchart of a method 200 for maintaining stable energy demand which is also capable of satisfying consumer energy demands over a period of time, is shown according to one embodiment. The method 200 may be performed in accordance with the present invention in any of the environments depicted in FIG. 1A, among others, in various embodiments. Of course, more or less operations than those specifically described in FIG. 2A may be included in method 200, as would be understood by one of skill in the art upon reading the present descriptions.

Each of the steps of the method 200 may be performed by any suitable component of the operating environment. For example, any one or more of the processes included in method 200 may be performed by a controller at an interface between a consumer and a utility (e.g., see 106 of FIG. 1A).

However, in other examples, any one or more of the processes included in method 200 may be performed by a controller at the utility location (e.g., see 108 of FIG. 1A). Moreover, in various other embodiments, the method 200 may be partially or entirely performed by a controller, a processor, a computer, etc., or some other device having one or more processors therein. Thus, in some embodiments, method 200 may be a computer-implemented method. In such embodiments, the computer used to implement the method may include the tape drive itself or a portion thereof such as the controller, the tape, an external host, a server, etc. The terms computer, processor and controller may also be used interchangeably with regards to any of the embodiments herein, such components being considered equivalents in the many various permutations of the present invention.

Moreover, for those embodiments having a processor, the processor, e.g., processing circuit(s), chip(s), and/or module (s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2A, operation 202 of method 200 includes receiving data which corresponds to energy consumption of two or more different consumer systems. The data is received differently depending on the approach. For instance, in some approaches the data is received recursively at a given frequency which is determined based on industry standards, energy demands currently being satisfied by the utility, operating conditions, etc. Moreover, the data is received in response to one or more requests sent in some approaches, while in other approaches the data is received automatically, e.g., as a result of a preprogrammed operating schedule. The data may also be received in any form depending on the approach, e.g., such as raw data, data which has been organized according to one or more metrics, data which has been pre-processed, etc.

Once received, the energy consumption data is used to generate a consumption profile for each of the consumer systems. See operation 204. The consumption profile for a given consumer system identifies recurring (e.g., preferred) energy consumption periods for each electrical component included in the given consumer system and a corresponding flexibility metric for each of the recurring (e.g., preferred) energy consumption periods. In other words, a consumption profile identifies times during the day that each of the different electrical components at a consumer system are typically used (e.g., draw current). Any consistencies in the start times, durations, manners (e.g., specific amounts of current drawn) which each of the given electrical components are used and/or supplemental information about the type of electrical components may be used to determine a relative flexibility associated with when and how they may be used.

According to an example, which is in no way intended to limit the invention, the consumption profile for a given consumer system identifies that an electric car begins charging at 5:30 PM every week day and that a central heating system is activated at about the same time each week day. A consumption profile for the given consumer system may thereby specify the reoccurring start time, duration, manner, etc. associated with charging a battery in the electric car, while the fact that the car battery is repeatedly charged at about 5:30 PM each week day during winter months (e.g., "supplemental information") may be used to deduce that the electric car is used to commute to work, and is charged upon returning home. The consumption profile may also specify the reoccurring start time, duration, manner, etc. associated with running the central heating system, while the fact that the central heating system repeatedly draws current at about 5:30 PM each week day during winter months (e.g., "supplemental information") may be used to deduce that the house is heated upon a user returning home from work. A flexibility metric associated with charging the electric car battery would thereby specify that the electrical device is inflexible to change prior to 5:30 PM (as the car typically has not yet returned home), and at least somewhat flexible to change after 5:30 PM through 1:00 AM the following morning. However, a flexibility metric associated with operating the central heating system in the present example would specify that the electrical device is relatively flexible to change, e.g., in order to establish a more efficient way to heat the house based on energy prices throughout the day, interior and/or exterior temperatures, user preferences, etc. It should also be noted that any of the deductions performed above may be performed using a domotics system, e.g., as would be appreciated by one skilled in the art after reading the present description.

Figure 2B:
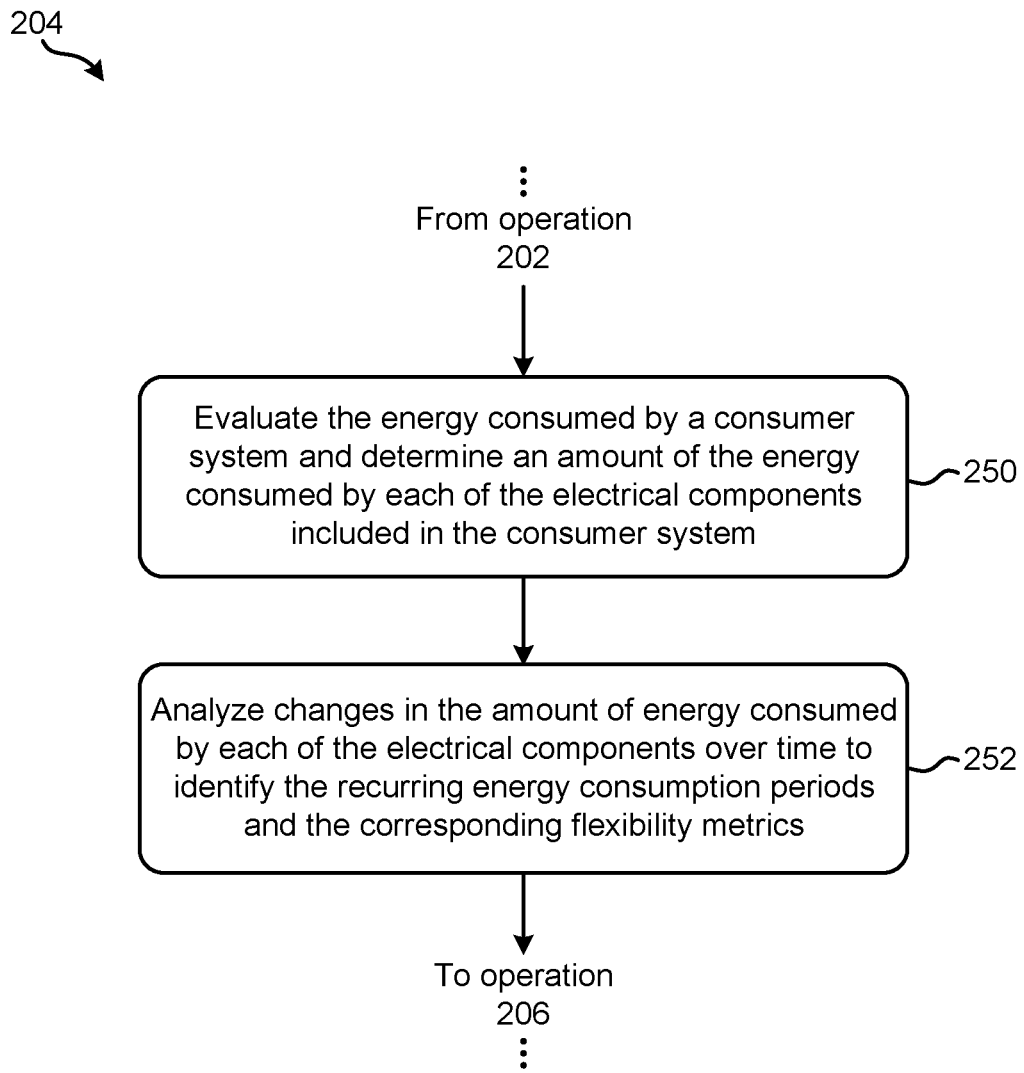
FIG. 2B is a flowchart of sub-processes for one of the operations in the method of FIG. 2A, in accordance with one embodiment.

Referring momentarily now to FIG. 2B, exemplary sub-processes of using the energy consumption data to generate a consumption profile for a given consumer system are illustrated in accordance with another embodiment, one or more of which may be used in the process of performing operation 204 of FIG. 2A. However, it should be noted that the sub-processes of FIG. 2B are illustrated in accordance with one embodiment which is in no way intended to limit the invention.

As shown, the flowchart of FIG. 2B includes determining an amount of energy consumed by each electrical component included at the given consumer system. See sub-operation 250. In other words, sub-operation 250 includes evaluating the energy consumed by a consumer system and determining an amount of the energy consumed by each of the electrical components included in the consumer system. In some approaches, determining the amount of energy consumed by each electrical component included at the given consumer system includes performing a signal decomposition of the energy consumed by the consumer system. Accordingly, a signal decomposition of a portion of the energy consumption data received in operation 202 which corresponds to the energy consumption of the given consumer system may be performed. It follows that the consumption profile for a given consumer system includes a multimodal distribution of the amount of energy consumed by each electrical component included at the given consumer system in some approaches. However, the amount of energy consumed by each electrical component included at a given consumer system may be determined using any procedures which would be apparent to one skilled in the art after reading the present description. It follows that the consumption profile for a given consumer system may represent the amount of energy consumed by each electrical component included at the given consumer system according to a different type of distribution.

From sub-operation 250, the flowchart proceeds to sub-operation 252, which includes analyzing changes in the amount of energy consumed by each of the electrical components over time to identify the recurring energy consumption periods and the corresponding flexibility metrics. As mentioned above, recurring energy consumption periods for a consumer system correspond to times during the day that each of the different electrical components at the consumer system are typically used (e.g., draw current). Moreover, any consistencies in the start times, durations, manners (e.g., specific amounts of current drawn) which each of the given electrical components are used and/or supplemental information about the type of electrical components may be used to determine a relative flexibility associated with when and how they may be used. According to an illustrative approach, a given flexibility metric is a mean of variance for the amount of energy consumed by each of the electrical components during the recurring energy consumption period which corresponds thereto.

Referring back to FIG. 2A, the energy consumption profiles are used, along with current energy demands, to predict upcoming energy demand trends. See operation 206. By combining the energy consumption profiles of the various consumer systems, and integrating current energy demands of the various consumer systems, increases and/or decreases in energy demand can be predicted before they actually occur. In some approaches, historical energy consumption data is also used to predict the upcoming energy demand trends. Accordingly, a utility is able to take steps to avoid undesirable energy demand spikes, e.g., by utilizing declines in energy demand. Again, the flexibility metric for the recurring (e.g., preferred) energy consumption periods of the respective electrical components at a given consumer system can be used to predict the likelihood that the consumer system will be receptive to suggested changes to the time, duration, frequency, etc. that the electrical components are used.

Proceeding to decision 208, a determination is made as to whether any upcoming energy demand trends have been predicted. For approaches in which operation 206 does not predict any upcoming energy demand trends, e.g., such as energy demand spikes, method 200 returns to operation 202 whereby additional data corresponding to energy consumption of the two or more consumer systems is received. The additional data may be used to update the respective energy consumption profiles, and any one or more of the processes in method 200 may be repeated.

Returning to decision 208, the flowchart proceeds to operation 210 in response to determining that one or more upcoming energy demand trends have been predicted. There, operation 210 includes issuing a targeted suggestion to each of one or more of the consumer systems prior to each of the predicted upcoming energy demand trends. Moreover, adjustments made to the energy demands of the consumer systems in response to receiving the targeted suggestions are preferably performed in real time, or at least substantially close to real time to increase applicability thereof.

Predicted energy demand trends which involve upcoming energy demand spikes are of particular interest, as increased demand applies added stress to the utility and the energy distribution system overall. It follows that in most approaches, each of at least some of the targeted suggestions issued in operation 210 propose making an amendment to the energy consumption of the respective consumer system in order to reduce energy demand during one or more corresponding predicted peak demand times. However, one or more of the targeted suggestions issued in operation 210 may propose making an amendment to the energy consumption of the respective consumer system in order to adjust energy demand in response to a different type of predicted energy demand trend. For example, a predicted drop in energy demand may ultimately cause one or more targeted suggestions to be issued to one or more respective consumer systems, the targeted suggestions advocating at least a temporary increase in energy consumption to utilize an energy surplus, maintain a homogeneous energy demand profile, etc.

It should also be noted that the suggestions issued in operation 210 are "targeted" in that each of the suggestions are crafted based on the recurring (e.g., preferred) energy consumption periods and the corresponding flexibility metric for the respective consumer system. In other words, each of the targeted suggestions are preferably computed by evaluating a predicted energy demand trend with respect to current energy demands of the consumer systems, and the consumption profiles thereof, to determine energy consumption adjustments which are able to at least somewhat correct (e.g., prevent) the predicted energy demand trend from occurring. Moreover, the flexibility metric associated with each of the consumer systems is also used to ensure that the targeted suggestions which are issued have a high likelihood of being implemented by the consumer systems to which they are suggested.

However, despite incorporating the flexibility metrics, some of the targeted suggestions issued in operation 210 are not actually implemented by the consumer systems in some approaches. For instance, a user in a consumer system may choose to act uncharacteristically in a given situation and reject the targeted suggestion issued thereto despite any incentives which may be associated with accepting the targeted suggestion. Accordingly, operation 212 includes determining whether each of the targeted suggestions are actually implemented by the consumer system to which they were respectively issued. In some approaches this determination is made based on the contents of a response received from each of the consumer systems, the contents of the response either confirming or denying implementation of the targeted suggestion. In other approaches, operation 212 is determined based on changes in the current energy demand of a subsystem which includes the consumer systems.

Moving to operation 214, the consumption profiles which correspond to the consumer systems are updated based on results of the determinations made in operation 212. For instance, a consumption profile corresponding to one of the consumer systems determined to have not implemented the targeted suggestion issued thereto is preferably updated such that the relevant flexibility metrics in the consumption profile provide a more accurate representation of the consumer system's inclination to changes in energy consumption. Similarly, a consumption profile corresponding to one of the consumer systems determined to have implemented the targeted suggestion issued thereto is preferably updated such that the relevant flexibility metrics in the consumption profile provide a more accurate representation of the consumer system's willingness to make changes to energy consumption.

As mentioned above, power demands fluctuate with peaks and valleys occurring throughout the day. It is therefore desirable for a power distribution system to be structured in such a way that these peak demand times can successfully be satisfied. According to some of the approaches included herein, demand is satisfied by actually shaping consumer demand such that it is more evenly distributed over time. It follows that the various processes and sub-processes described above with respect to FIGS. 2A-2B are able to reshape the energy demands of consumer systems such that the power demands are more homogeneous. Moreover, applying this scheme in the context of smart buildings and smart grids results in significant monetary savings for consumers and energy distribution companies alike.

As described above, these improvements result from learning customer habits and constraints that can then be used to issue suggestions which are able to improve consumption habits in an attainable and tailored fashion. In order to achieve this level of consumer understanding, there are different components at play. One such component involves learning the habits of a given consumer system (e.g., user) in addition to determining how flexible the consumer system is with respect to their energy demands. Determinations are made as to whether energy demand shifts can be made in order to avoid predicted peak demand times without significantly effecting performance at the consumer system. A number of cognitive systems in the consumer system environment may be used to obtain information pertinent to making these determinations even more accurate. According to an example, prediction models may be further improved by evaluating the household level cognitive system in the context of domotics and/or a system that can monitor a consumer system in depth. In this example, estimates of habits and constraints may be refined over time. This information may further be relayed to a central controller which is able to communicate with a utility which satisfies the electrical demand, as well as the cognitive systems in the consumer system environment. As described herein, the central controller is also able to continue monitoring energy supplied by the grid in order to predict additional peak demand times, e.g., by applying historical data in some approaches.

It should also be noted that various ones of the approaches included herein may also be implemented in conjunction with a reward system which is based on whether targeted suggestions are actually implemented at each of the consumer systems. This relationship may further be represented in a reward table (e.g., lookup table). The reward table is received from the utility in some approaches, and may outline a system for rewarding stability of power demanded by a number of consumer systems and consequently placed on the utility. The reward table may be stored in memory at each of the consumer systems, accessed by the consumer at a designated location (e.g., a Uniform Resource Locator (URL)), provided to the consumer upon request, etc. depending on the approach. Moreover, the reward table may be predetermined, updated over time, adjusted in real-time, replaced with an alternative system of determining selecting and/or setting a target power demand, etc., according to various approaches.

Furthermore, it should be noted that while various ones of the embodiments included herein focus on the management of demand for electrical energy, any of the embodiments included herein may be applied in a variety of different industries that use metered services for a commodity that can be stored. These commodities include water, natural gas and other fuels, internet services (e.g., streaming and cloud services, especially cloud storage), etc., as would be appreciated by one skilled in the art after reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving data which corresponds to energy consumption of two or more different consumer systems;
using the energy consumption data to generate a consumption profile for each of the consumer systems, wherein the consumption profile for a given consumer system identifies recurring energy consumption periods for the given consumer system and a corresponding flexibility metric for each of the recurring energy consumption periods;
using the consumption profiles along with current energy demands to predict peak demand times;
prior to each of the predicted peak demand times, issuing a suggestion to each of one or more of the consumer systems, wherein each of the suggestions proposes making an amendment to the energy consumption of the respective consumer system wherein implementing the suggestions achieves energy demand peak reduction and improves energy distribution efficiency by reducing energy demand during one or more of the predicted peak demand times;
causing at least some of the suggestions to be implemented by the respective consumer systems absent consumer interaction;
for each of the suggestions, determining whether the given suggestion is implemented by the consumer system to which it was issued; and
updating the consumption profiles based on results of the determinations.

2. The computer-implemented method of claim 1, wherein using the energy consumption data to generate a consumption profile for a given consumer system includes:
separating an amount of electrical current drawn by each electrical component physically coupled to the given consumer system; and
analyzing changes in the amount of electrical current drawn by each electrical component physically coupled to the given consumer system over time to identify the recurring energy consumption periods and the corresponding flexibility metrics,
wherein the consumption profile for the given consumer system includes a multimodal distribution of the amount of electrical current drawn by each electrical component physically coupled to the given consumer system.

3. The computer-implemented method of claim 2, wherein determining the amount of electrical current drawn by each electrical component included at the given consumer system includes:
performing a signal decomposition of a portion of the energy consumption data which corresponds to energy consumption of the given consumer system.

4. The computer-implemented method of claim 2, wherein a given flexibility metric is a mean of variance for the amount of electrical current drawn by each of the electrical components during the recurring energy consumption period which corresponds thereto.

5. The computer-implemented method of claim 2, wherein the consumption profile for a given consumer system includes a multimodal distribution of the amount of electrical current drawn by each electrical component included at the given consumer system.

6. The computer-implemented method of claim 1, wherein each of the suggestions are crafted based on the recurring energy consumption periods and the corresponding flexibility metric for the respective consumer system, wherein the two or more different consumer systems are in a same microgrid.

7. A computer program product comprising a computer readable storage medium having program instructions embodied therewith, the program instructions readable and/or executable by a processor to cause the processor to:
receive, by the processor, data which corresponds to energy consumption of two or more different consumer systems;
use, by the processor, the energy consumption data to generate a consumption profile for each of the consumer systems, wherein the consumption profile for a given consumer system identifies recurring energy consumption periods for the given consumer system and a corresponding flexibility metric for each of the recurring energy consumption periods;
use, by the processor, the consumption profiles along with current energy demands to predict peak demand times;
prior to each of the predicted peak demand times, issue, by the processor, a suggestion to each of one or more of the consumer systems, wherein each of the suggestions proposes making an amendment to the energy consumption of the respective consumer system, wherein implementing the suggestions achieves energy demand peak reduction and improves energy distribution efficiency by reducing energy demand during one or more of the predicted peak demand times;
cause, by the processor, at least some of the suggestions to be implemented by the respective consumer systems absent consumer interaction;
for each of the suggestions, determine, by the processor, whether the given suggestion is implemented by the consumer system to which it was issued; and
update, by the processor, the consumption profiles based on results of the determinations.

8. The computer program product of claim 7, wherein using the energy consumption data to generate a consumption profile for a given consumer system includes:
separating an amount of electrical current drawn by each electrical component electrically coupled to the given consumer system; and
analyzing changes in the amount of electrical current drawn by each electrical component electrically coupled to the given consumer system over time to identify the recurring energy consumption periods and the corresponding flexibility metrics,
wherein the consumption profile for the given consumer system includes a multimodal distribution of the amount of electrical current drawn by each electrical component electrically coupled to the given consumer system.

9. The computer program product of claim 8, wherein determining the amount of electrical current drawn by each electrical component included at the given consumer system includes:
performing a signal decomposition of a portion of the energy consumption data which corresponds to energy consumption of the given consumer system.

10. The computer program product of claim 8, wherein a given flexibility metric is a mean of variance for the amount of electrical current drawn by each of the electrical components during the recurring energy consumption period which corresponds thereto.

11. The computer program product of claim 8, wherein the consumption profile for a given consumer system includes a multimodal distribution of the amount of electrical current drawn by each electrical component included at the given consumer system.

12. The computer program product of claim 7, wherein each of the suggestions are crafted based on the recurring energy consumption periods and the corresponding flexibility metric for the respective consumer system, wherein the two or more different consumer systems are in a same microgrid.

13. A system, comprising:
a processor; and
logic integrated with the processor, executable by the processor, or integrated with and executable by the processor, the logic being configured to:
receive, by the processor, data which corresponds to energy consumption of two or more different consumer systems;
use, by the processor, the energy consumption data to generate a consumption profile for each of the consumer systems recurring energy consumption periods for the given consumer system and a corresponding flexibility metric for each of the recurring energy consumption periods;
use, by the processor, the consumption profiles along with current energy demands to predict peak demand times;
prior to each of the predicted peak demand times, issue, by the processor, a suggestion to each of one or more of the consumer systems, wherein each of the suggestions proposes making an amendment to the energy consumption of the respective consumer system, wherein implementing the suggestions achieves energy demand peak reduction and improves energy distribution efficiency by reducing energy demand during one or more of the predicted peak demand times;
cause, by the processor, at least some of the suggestions to be implemented by the respective consumer systems absent consumer interaction;
for each of the suggestions, determine, by the processor, whether the given suggestion is implemented by the consumer system to which it was issued; and
update, by the processor, the consumption profiles based on results of the determinations.

14. The system of claim 13, wherein using the energy consumption data to generate a consumption profile for a given consumer system includes:
determining an amount of energy consumed by each electrical component included at the given consumer system; and analyzing changes in the amount of energy consumed by each of the electrical components over time to identify the recurring energy consumption periods and the corresponding flexibility metrics.

15. The system of claim 14, wherein determining the amount of energy consumed by each electrical component included at the given consumer system includes:

performing a signal decomposition of a portion of the energy consumption data which corresponds to energy consumption of the given consumer system, wherein the energy consumption data was collected at the given consumer system by an internet of things (IoT) system, wherein the IoT system is configured to collect the energy consumption data from the electrical components included at the given consumer system.

16. The system of claim 14, wherein a given flexibility metric is a mean of variance for the amount of energy consumed by each of the electrical components during the recurring energy consumption period which corresponds thereto.

17. The system of claim 14, wherein the consumption profile for a given consumer system includes a multimodal distribution of the amount of energy consumed by each electrical component included at the given consumer system.

18. The system of claim 13, wherein each of the suggestions are crafted based on the recurring energy consumption periods and the corresponding flexibility metric for the respective consumer system, wherein the two or more different consumer systems are in a same microgrid.

* * * * *